May 15, 1928.

F. S. CARR 1,670,280

FASTENER

Filed June 14, 1924

Inventor:
Fred S. Carr
by Emery, Booth, Janney & Varney
Attys.

May 15, 1928.
F. S. CARR
1,670,280
FASTENER
Filed June 14, 1924   2 Sheets-Sheet 2
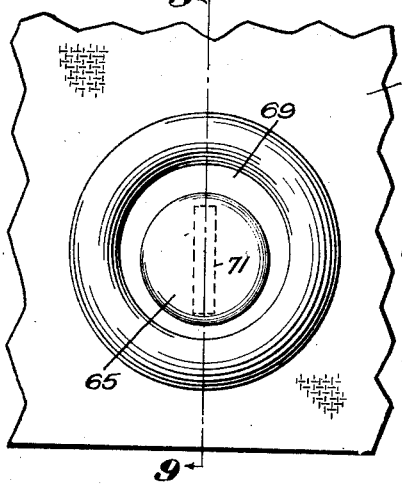
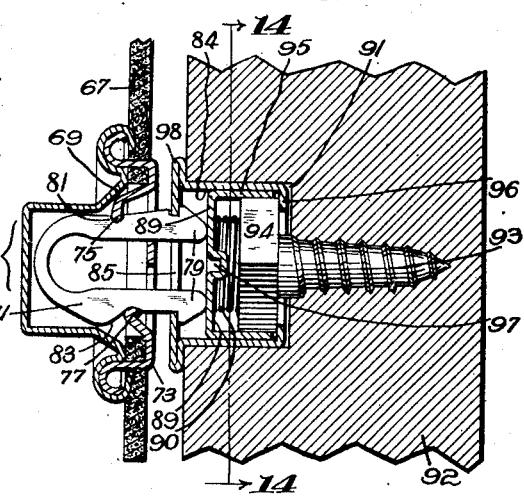
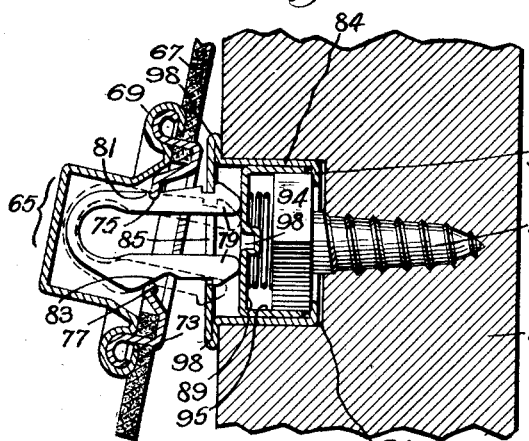
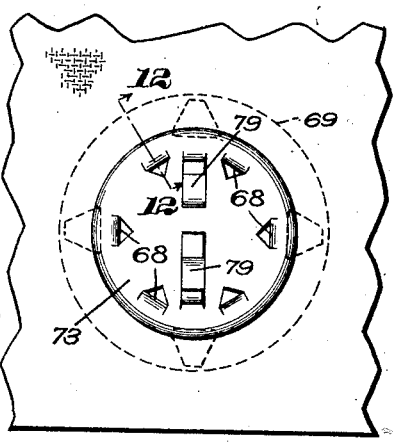
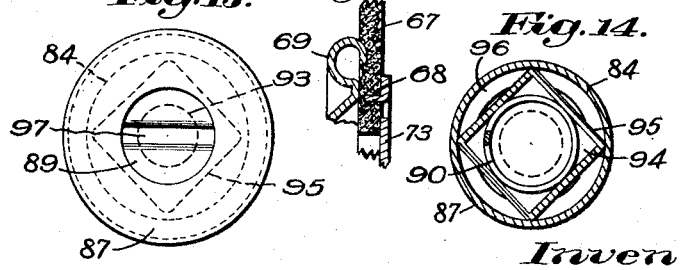
Inventor:
Fred S. Carr.

Patented May 15, 1928.

1,670,280

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed June 14, 1924. Serial No. 719,931.

This invention aims to provide improvements in fasteners.

In the drawings, which show two illustrative embodiments of my invention:—

Fig. 8 is a front elevation of a modified form of my device;

Fig. 9 is a section, partly in elevation, on the line 9—9 of Fig. 8;

Fig. 10 is a section similar to Fig. 9 showing the stud being withdrawn from the socket;

Fig. 11 is a rear elevaton of the modified form of stud;

Fig. 12 is a section on the line 12—12 of Fig. 11;

Fig. 13 is a front elevation of the modified form of socket; and

Fig. 14 is a section on the line 14—14 of Fig. 9.

Figure 1:
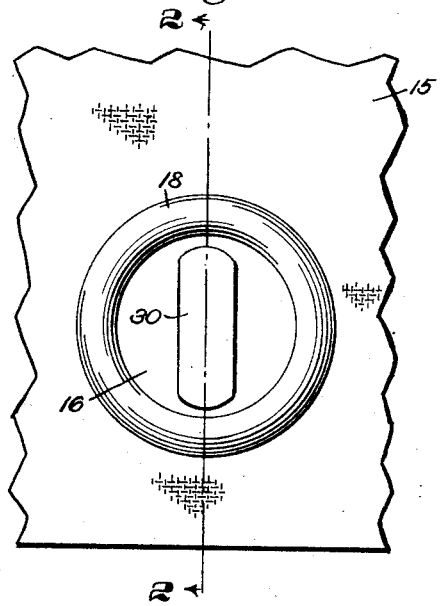
Figure 1 is a front elevation of a preferred form of my device.
Figure 2:
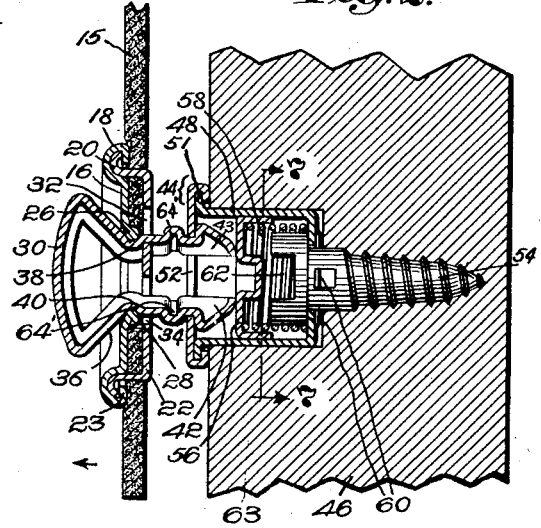
Fig. 2 is a section, partly in elevation, on the line 2—2 of Fig. 1.
Figure 3:
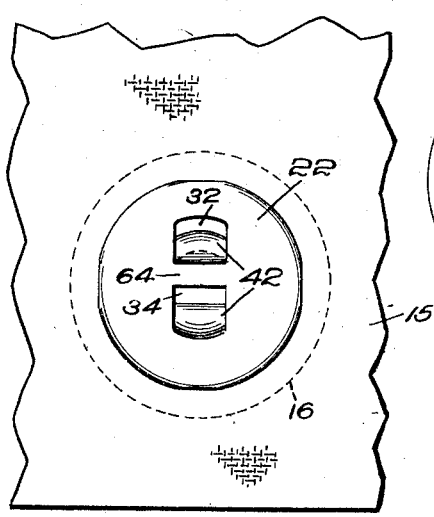
Fig. 3 is a rear elevation of the stud.
Figure 4:
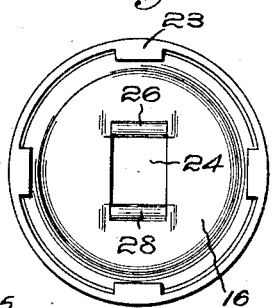
Fig. 4 is a rear elevation of the front plate of the stud.
Figure 5:
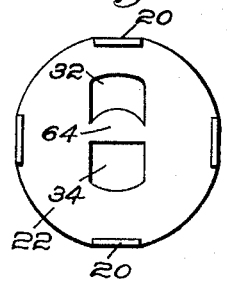
Fig. 5 is an elevation of the back plate of the stud.
Figures 6, 7:
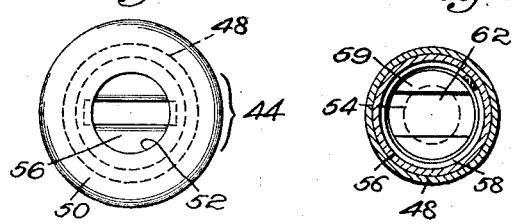
Fig. 6 is a front elevation of the preferred form of socket.
Fig. 7 is a section on the line 7—7 of Fig. 2.

Referring to the preferred embodiment of my device illustrated in Fig. 1 through 7, I have shown a stud secured to a flexible stud-carrying medium, such for instance as the curtain 15 of an automobile. The stud may be secured to the curtain 15 in any convenient manner, but I have shown it secured thereto by a form of attaching means (Fig. 2) which includes a front plate 16 located upon the front face of the curtain 15. This front plate 16 has an anvil portion 18 adjacent its outer periphery against which prongs 20, extending from a back plate 22 on the back side of the curtain, are deflected outwardly and downwardly against with an inwardly turned flange 23 integral with the anvil portion 18 of the front plate 16. Thus the curtain is firmly gripped between the front plate 16 and back plate 22 as best illustrated in Fig. 2.

The front plate 16 presents a rectangular aperture 24 having, at its upper and lower edges, reversely bent flanges 26 and 28 (Fig. 4) upon which is pivoted a resilient socket-engaging member 30. This member passes through the aperture 24 in the front plate, the curtain 15, and apertures 32 and 34 in the back plate 22 and extends beyond the back plate 22 where it is presented for engagement with a socket.

The socket-engaging member 30 is preferably pressed from a single sheet of metal and is so formed that it has a sloping portion 36 (Fig. 2), which extends from the outer end thereof in an upward direction where it terminates at a depression 40 which engages the reversely bent flange 28 of the front plate. This depression 40 and a similar depression 38 which engages the flange 26, hold the socket-engaging member in assembled relation to the front plate and back plate when secured to the curtain 15. Beyond the back plate 22, the socket-engaging member is formed to present two parallel portions terminating in a stud head back of which is provided abruptly shouldered socket-engaging jaws 42 and 43 respectively which are adapted to make locking engagement with the socket, as shown in Fig. 2.

For the purposes of this application I shall also refer to the sloping portion 36 as a cam-actuated part and the reversely bent flange 28 or portion adjacent thereto as a cam part to provide fastener separating cam means.

The preferred form of socket 44, as illustrated in Fig. 2, is countersunk into the body 46 of an automobile or the like, thereby to provide a flush type socket. This socket includes a body part 48 to which is secured a front plate 50 by rolling a portion of the outer periphery of the front plate 50 over a flange 51 located at the outer end of the body part 48. The front plate presents a stud-receiving aperture 52 normally closed by a sealing disc 56 urged into aperture-closing position by a spring 58, thereby excluding dust and dirt from the socket when the stud is not secured thereto.

The body part 48 of the socket has secured to it, at its inner end, an attaching screw 54 having a head 59 seated against the inside of the end of the body part 48. The head 59 is held thereagainst by a plurality of petal-like projections 60, which are shaved from the attaching screw and clench against the outer surface of the end of the body part, thereby preventing axial movement of the attaching screw relative to the socket.

To attach the socket to the body 46 of the car, I have provided a screw-driver slot 62 in the head 59 of the attaching screw, and a second screw-driver slot or depression 63 in the sealing disc 56. In attaching the socket, a screw-driver blade is inserted through the stud-receiving aperture 52 and into the depression 63. The sealing disc is then pushed forward, and at the same time rotated in a clockwise direction until the depression portion of the sealing disc engages in the slot 62 in the head of the attaching screw 54. Further rotation of the screw-driver turns the screw 54 into the body 46 of the car, thus drawing the body part 48 of the socket into the socket-receiving recess therein until the flange, formed by the front plate 50, is seated against the side of the car, as best illustrated in Fig. 2.

When the socket-engaging member 30 is secured to the socket, as shown in Fig. 2, the abrupt shouldered jaws 42 and 43 are locked with the socket and cannot be separated therefrom by an outward pull upon the curtain 15 from above the stud or at both sides thereof, thus providing a three-side lock flush type fastener.

To prevent separation of the fastener by a lateral strain exerted upon the curtain from above the stud, I have provided a shoulder or stop 64 (Figs. 2 and 5) upon the back plate 22. This stop engages the under side of the upper jaw member, thereby preventing an upward strain from moving the lower jaw member toward the upper jaw member. Thus the jaw 43 is held substantially rigid relative to the back plate 22. Movement of the jaws into the socket is prevented by providing shoulders 64' upon each of the jaw members adjacent the socket, thereby cooperating with the stop 64 on the back plate 22 to prevent tipping of the stud out of engagement with the socket when an upward lateral strain is exerted upon the curtain.

Separation of the stud from the socket can only be effected by grasping the lower edge of the curtain 15 and exerting a slight pull in the direction of the arrow indicated in Fig. 2 to operate the fastener separating cam means. This action tips the front plate 16, curtain 15 and back plate 22 as a unit about the reversely bent flange 26 on the front plate as a pivot; thus the reversely bent flange or cam part 28 rides down the sloping portion of the cam-actuated part 36 and urges the socket-engaging jaw 42 toward the jaw 43 until the shoulder of the jaw is free to pass through the stud-receiving aperture 52. So far in the disengaging operation, the socket-engaging member 30 has remained substantially stationary relative to the socket, the only effect being the contraction of one of the jaws, while the rest of the stud member and the curtain has been tipping relative to the socket-engaging member.

From the position above described, the socket-engaging member may be tipped out of engagement with the socket. The jaw 43 does not contract during the entire disengaging operation, but is finally tipped out of engagement with the socket.

When free from the socket, the resiliency of the socket-engaging member forces the parts of the stud back into their normal relation to one another.

Referring now to the modified form of my device as illustrated in Figs. 9 through 14, I have shown a stud 65 secured to a curtain 67 in substantially the same manner as the preferred form of device is secured to the curtain 15. In this instance, however, I have provided a plurality of short prongs 68 pressed from the back plate 73, which grip the curtain but do not cut the threads thereof, as best illustrated in Fig. 12.

In this embodiment of my device, the front plate 69 does not support the socket-engaging member 71, but merely provides attaching means for securing the stud to the curtain and also encloses the socket-engaging member so that it is not exposed at the front face of the curtain.

The back plate 73 provides a pivot 75 upon which the socket-engaging member 71 is pivoted and this back plate also presents a cam portion 77. Both the pivot 75 and cam-engaging portion 77 are pressed inwardly from the face of the back plate 73, so that a lateral strain exerted upon the curtain will not tip the front plate 69 and back plate 73, as a unit, relative to the socket-engaging member 71.

The resilient socket-engaging member 71 is stamped from a single sheet of metal and provides socket-engaging jaws 79—79, a recess 81 for engagement with the pivot 75 and a cam actuated part 83 having a sloping surface for engagement with the cam portion 77 of the back plate. This socket-engaging member is rounded (Figs. 9 and 10) at its outer end to provide a resilient portion, thereby to permit contraction and expansion of one of the jaws when engaging and disengaging the socket.

The modified form of socket, as illustrated, includes a casing 84 presenting a stud-receiving aperture 85 normally closed by a sealing disc 89 which is urged into aperture-closing position by a spring 90. The socket casing 84 is preferably countersunk into a recess 91 in the body 92 of the car and is secured therein by an attaching screw 93.

The attaching screw 93 presents a polygonal head 94 which is engaged by the tubular portion 95 of the sealing disc 89 of substantially the same cross-section as the head of the attaching screw. When the socket is not attached to its support, the attaching screw is resiliently pressed against the depending flange 96 at the inner end of the casing by the spring 90, which is interposed between the sealing disc and the head of the attaching screw. In this instance, as illustrated, (Fig. 14) the attaching screw and the sealing disc are free to rotate relative to the casing 84.

The socket may be attached to the body 92 of the car by inserting the blade of a screwdriver or like tool through the stub-receiving aperture 85 and into a screw-driver slot 97 (Fig 13) provided in the face of the sealing disc 89. Then by rotating the screwdriver in a clockwise direction, the screw 93 is screwed into the body 92 of the car, thus drawing the casing of the socket into the recess 91 in the body of the car until the flange 98, located at the outer end of the casing, seats against the side of the car. During attachment of the socket to the body of the car, there may be some axial movement of the sealing disc 89 and attaching screw 93 relative to the casing 84, but when the flange 98 is seated against the side of the car, the head of the attaching screw seats against the depending flange 96 at the inner end of the casing 84 and prevents further axial movement of the attaching screw relative to the casing.

Engagement and disengagement of the stud and socket is effected in substantially the same manner as described relative to the preferred embodiment of my device.

While I have shown and described preferred forms of embodiments of my invention, it will be understood that changes may be made involving omission, alteration, substitution and reversal of parts, and even changes in the mode of operation, without departing from the scope of my invention, which is best defined in the following claims.

Claims:

1. A separable fastener comprising, in combination, a socket presenting a stud-receiving aperture, a cooperating stud presenting a socket-engaging part having socket-engaging jaw means for engagement with the wall of said aperture, attaching means securing said stud part to a flexible stud-carrying medium and cam-actuated means provided as a part of said socket-engaging part, said cam-actuated means operatively cooperating with a cam part provided by said attaching means, said cam-actuated means being operable by tipping said attaching means relative to said socket-engaging part thereby to force said jaw means together prior to disengagement thereof.

2. A separable fastener comprising, in combination, a socket presenting a stud-receiving aperture, a cooperating stud presenting a socket-engaging part having opposed resilient jaws for engagement with said aperture, abrupt shoulders on said jaws for locking said stud and socket against separation by a pull at three sides, attaching means securing said socket-engaging part to a flexible stud-carrying medium and cam means provided on said socket-engaging part and cooperating with said attaching means, said cam means being operable by tipping said attaching means relative to said socket-engaging part, thereby to move one of said jaws toward the other to permit separation of said stud from said socket.

3. A separable fastener comprising, in combination, a socket presenting a stud-receiving aperture, a stud having opposed jaw members for engagement with said aperture, abrupt shoulders on said jaws for locking said stud to said socket, stud-attaching means pivoted upon the upper jaw member and shiftable relative to the lower jaw member to provide a cam action for separating said stud from said socket, and said attaching means engaging the under side of said upper jaw member to prevent separation of said stud from said socket by an upward lateral strain on said attaching means.

4. A separable fastener comprising, in combination, a socket presenting a stud-receiving aperture, a stud having opposed jaw members for engagement with said aperture, abrupt shoulders on said jaws for locking said stud to said socket, stud-attaching means pivoted upon the upper jaw member and shiftable relative to the lower jaw member to provide a cam action for separating said stud from said socket, said attaching means engaging the under side of said upper jaw member whereby an upward strain on the attaching means cannot move said lower jaw member toward said upper jaw member, thus preventing separation of said stud from said socket.

5. A separable fastener comprising, in combination, a socket presenting a stud-receiving aperture, a cooperating stud for engagement therewith having a pair of abrupt shouldered socket-engaging jaws, attaching means for securing said jaws to a flexible support, means for maintaining one of said jaws substantially rigid relative to said attaching means to prevent separation of said stud from said socket by a lateral strain at that side of the flexible support adjacent said rigid jaw and cam means forming part of the fastener assembly and operable by shifting said attaching means relative to the other of said jaws, thereby to move said second-mentioned jaw toward said substantially rigid jaw to permit separation of said stud from said socket.

6. A three-side lock fastener comprising, in combination, a socket presenting a stud-receiving aperture, a cooperating stud presenting a socket-engaging part having parallel socket-engaging jaw members, attaching means securing said socket-engaging part to a flexible stud-carrying medium, locking means forming part of the fastener assembly for locking said stud and socket against separation at three sides thereof and cam means provided on said socket-engaging part and cooperating with said attaching means, said cam means being operable by tipping said attaching means at the fourth side thereof relative to said socket-engaging jaw members to separate said stud from said socket.

7. A three-side lock fastener comprising, in combination, a socket presenting a stud-receiving aperture, a stud including a front plate and back plate secured to opposite sides of a flexible stud-carrying curtain, a resilient socket-engaging member pivoted upon one of said plates and presenting a pair of jaws for engagement with said aperture, stop means for preventing contraction of the upper jaw when lateral strain is exerted in an upward direction upon said curtain, cam means provided by said socket-engaging member, said cam means being operable by movement of one of said plates when said plates and curtain are tipped as a unit by a pull exerted at a predetermined side of said stud thereby to move the lower jaw toward the upper jaw to permit separation of said stud from said socket.

8. A three-side lock fastener comprising, in combination, a socket presenting a stud-receiving aperture, a stud including a front plate and back plate secured to opposite sides of a flexible stud-carrying curtain, a resilient socket-engaging member pivoted upon said front plate and presenting a pair of jaws for engagement with a wall surrounding said aperture, a stop located upon said back plate for preventing contraction of the upper jaw when lateral strain is exerted in an upward direction upon said curtain, cam means provided by said socket-engaging member, said cam means being operable by movement of one of said plates when said plates and curtain are tipped as a unit by a pull exerted at a predetermined side of said stud, thereby to move the lower jaw toward the upper jaw to permit separation of said stud from said socket.

9. A three-side lock fastener comprising, in combination, a socket presenting a stud-receiving aperture, a stud including a front plate and back plate secured to opposite sides of a flexible stud-carrying curtain, a resilient socket-engaging member pivoted upon said front plate and presenting a pair of jaws for engagement with said aperture, a shoulder on said socket-engaging member adjacent said socket to prevent movement of said jaws into said socket when a lateral strain is exerted upon said curtain, a stop located upon said back plate for preventing contraction of the upper jaw when lateral strain is exerted in an upward direction upon said curtain, cam means provided by said socket-engaging member, said cam means being operable by movement of one of said plates when said plates and curtain are tipped as a unit by a pull exerted at a predetermined side of said stud, thereby to move the lower jaw toward the upper jaw to permit separation of said stud from said socket.

10. A fastener comprising, in combination, a socket for attachment to a rigid socket-carrying medium and a stud presenting a socket-engaging part for attachment to a flexible stud-carrying medium, said stud presenting an expansible and contractible head for entrance in a stud-receiving aperture presented by said socket and fastener-separating cam means comprising a cam-actuated part and a cam part forming parts of the stud assembly and being operable by shifting the stud-carrying medium relative to said socket-engaging part in one predetermined direction for effecting contraction of said head of said stud thereby permitting withdrawal thereof from said stud-receiving aperature.

11. A fastener comprising, in combination, a socket for attachment to a rigid socket-carrying medium, a stud part, attaching means for securing said stud part to a flexible stud-carrying medium, said stud presenting an expansible and contractible head for entrance in a stud-receiving aperture presented by said socket, jaw means presented by said stud and engaging said socket for preventing accidental separation of the fastener and fastener-separating means forming part of the stud assembly, said fastener-separating means comprising a cam-actuated part provided as a part of the stud part and a cam part provided as a part of the stud-attaching means whereby shifting the stud-carrying medium relative to said stud in one predetermined direction operates the fastener-separating means to effect contraction of said head of said stud and permit withdrawal thereof from said stud-receiving aperture.

12. A separable fastener comprising, in combination, a socket member and a stud member, a fixed shoulder presented by one of said members, resiliently mounted jaw members presented by the other of said members, said jaw members presenting downwardly extending shoulders for positive locking engagement behind said fixed shoulder, fastener-separating means forming part of the stud assembly, said fastener-separating means comprising a cam-acuated part and a cam part provided as parts of the stud assembly whereby shifting of the stud-carrying medium relative to the stud part in one predetermined direction operates the fastener-separating means to move one of the shoulders provided by said jaw members out of engagement with said fixed shoulder to permit separation of the stud member from the socket.

13. A socket for a separable fastener including a casing presenting a stud-receiving aperture, attaching means for securing said casing to a support and tool-receiving means located inwardly of said stud-receiving aperture for non-rotatively engaging said attaching means.

14. A socket for a separable fastener including a casing presenting an attaching screw secured to the inner end of said casing, tool-receiving means within said casing for non-rotative engagement with the head of said attaching screw, said tool-receiving means adapted to receive a tool for rotating said tool-receiving means and said attaching screw as a unit when securing said casing to a support.

15. A socket for a separable fastener including a casing presenting at the inner end thereof an attaching screw having a head located within said casing, a stud-receiving aperture presented at the opposite end of said casing from said attaching screw, a spring-pressed sealing disc normally closing said aperture and a tool-receiving depression in said sealing disc for reception of a tool thereby to rotate said sealing disc and attaching screw as a unit when securing said casing to a support.

16. A flush type socket for a separable fastener including a casing, an attaching screw secured to said casing, and a spring-pressed sealing disc presenting means for engagement with said screw to permit rotation of said screw when said sealing disc is rotated.

17. A flush type socket for a separable fastener including a casing, an attaching screw secured thereto, a head on said attaching screw presenting a slot across said head, and a spring-pressed sealing disc presenting a depressed portion for reception of a suitable tool, said depressed portion engageable with said slot to permit rotation of said screw for attaching said casing to a support.

In testimony whereof, I have signed my name to this specification.

FRED S. CARR.